(12) United States Patent
Secouard et al.

(10) Patent No.: US 12,341,361 B2
(45) Date of Patent: Jun. 24, 2025

(54) ASSEMBLY OF ELECTRICAL ENERGY STORAGE OR PRODUCTION CELLS COMPRISING A MANAGEMENT CIRCUIT FOR MANAGING THE CELLS

(71) Applicant: COMMISSARIAT A L'ENERGIE ATOMIQUE ET AUX ENERGIES ALTERNATIVES, Paris (FR)

(72) Inventors: Christophe Secouard, Grenoble (FR); Ghislain Despesse, Grenoble (FR); Sami Oukassi, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 246 days.

(21) Appl. No.: 17/228,557

(22) Filed: Apr. 12, 2021

(65) Prior Publication Data

US 2021/0328440 A1     Oct. 21, 2021

(30) Foreign Application Priority Data

Apr. 16, 2020   (FR) ...................... 2003824

(51) Int. Cl.
*H02J 7/00*          (2006.01)
(52) U.S. Cl.
CPC .......... *H02J 7/0013* (2013.01); *H02J 7/0063* (2013.01)
(58) Field of Classification Search
CPC .................................................. H02J 7/0013
See application file for complete search history.

(56) References Cited

U.S. PATENT DOCUMENTS

| 9,252,415  | B2  | 2/2016 | Askarinya et al. |
| 9,635,147  | B2  | 4/2017 | Ghaed et al. |
| 10,950,902 | B2* | 3/2021 | Hwang ............... H01M 10/425 |

(Continued)

FOREIGN PATENT DOCUMENTS

| CN | 108 666 638 A | 10/2018 |
| CN | 110 784 095 A | 2/2020 |

(Continued)

*Primary Examiner* — Tynese V McDaniel
(74) *Attorney, Agent, or Firm* — BakerHostetler

(57) ABSTRACT

An assembly able to deliver an output current, includes N electrical energy storage or production cells of rank i, where $N \geq 2$, being able to supply a maximum current $I_{max,i}$ at all times t; a management circuit for managing the electrical energy storage or production cells, wherein, with the cells being classed according to their rank i in decreasing priority of use, the management circuit comprises means for addressing at least the cell of rank 1 or the cells according to their rank i and according to the following criteria: the cell of rank 1 is addressed on its own as long as it is able to supply the output current $I_s < I_{max1}$; the cell of rank 1 is addressed with additionally a number k of cells that are addressed successively according to their rank i, so as to supply the current Is at all times in discharge mode, the number k being such that $2 < k \leq N$ and meeting the following conditions:

$$\Sigma_{i=1}^{k-1} I_{max,i} < I_s \text{ and } \Sigma_{i=1}^{k} I_{max,i} \geq I_s$$

8 Claims, 8 Drawing Sheets

(56) References Cited

U.S. PATENT DOCUMENTS

| | | | | |
|---|---|---|---|---|
| 2008/0157743 | A1* | 7/2008 | Martin | H02M 3/1584 |
| | | | | 323/284 |
| 2012/0176091 | A1* | 7/2012 | Abe | H02J 7/0029 |
| | | | | 320/132 |
| 2013/0038289 | A1* | 2/2013 | Tse | H02J 7/0013 |
| | | | | 320/126 |
| 2014/0287278 | A1* | 9/2014 | Despesse | H01M 50/213 |
| | | | | 429/50 |
| 2016/0043580 | A1* | 2/2016 | Rush, Jr. | H02J 7/0048 |
| | | | | 320/101 |
| 2016/0049813 | A1* | 2/2016 | Takizawa | H02J 7/0019 |
| | | | | 320/112 |
| 2016/0156202 | A1* | 6/2016 | Kim | H02J 7/0014 |
| | | | | 320/134 |
| 2016/0226268 | A1* | 8/2016 | Okui | H02J 7/0071 |
| 2017/0229880 | A1* | 8/2017 | Jhunjhunwala | H01M 10/4207 |
| 2019/0027943 | A1* | 1/2019 | Rothschild | H02J 7/0024 |
| 2020/0251920 | A1* | 8/2020 | Ha | H01M 10/482 |
| 2020/0266627 | A1* | 8/2020 | Ha | H02J 1/106 |
| 2021/0168964 | A1* | 6/2021 | Nakaya | H02J 7/0048 |
| 2022/0037910 | A1* | 2/2022 | Tikhonski | H02J 7/0063 |
| 2022/0294036 | A1* | 9/2022 | Sharma | H02J 7/02 |
| 2024/0213786 | A1* | 6/2024 | Chen | H02J 7/00306 |

FOREIGN PATENT DOCUMENTS

| | | |
|---|---|---|
| EP | 3 203 599 A1 | 8/2017 |
| JP | 2003-178786 A | 6/2003 |
| JP | 2015-165732 A | 9/2015 |

* cited by examiner

ASSEMBLY OF ELECTRICAL ENERGY STORAGE OR PRODUCTION CELLS COMPRISING A MANAGEMENT CIRCUIT FOR MANAGING THE CELLS

CROSS-REFERENCE TO RELATED APPLICATIONS

This application claims priority to foreign French patent application No. FR 2003824, filed on Apr. 16, 2020, the disclosure of which is incorporated by reference in its entirety.

FIELD OF THE INVENTION

The field of the invention is that of assemblies of electrical energy storage or production cells, such as electric batteries, hydrogen fuel cells, and relates more precisely to an assembly comprising a management circuit for managing the cells, making it possible to increase the usable energy of said assembly or else the period of autonomy of the system supplied by said assembly.

BACKGROUND

The problem addressed in the present invention relates to the drop in the capacity to supply current starting from a certain state of charge and the period of autonomy of the systems supplied by electrical energy storage or production cells.

Generally speaking, the charging and discharging regime of a battery may be characterized by the parameter commonly called "C-Rate". A battery of 1 mAh evaluated at 1 C means that the battery is able to supply 1 mA for one hour if it discharges with a regime of 1 C.

The storage capacity of the battery is generally supplied by manufacturers with the specifications of the battery, corresponding to the product of hours multiplied by the nominal current that this battery is able to supply at 20° C., until reaching a predetermined end-of-discharge voltage of the cell. For this reason, a nominal capacity of the battery is linked to the expected discharge period.

The Applicant has demonstrated a sharp drop in the capacity to supply a nominal current starting from a certain state of discharge in the case of microbatteries. This decrease, even though it is less significant and more gradual for high-capacity Li-ion batteries, also exists.

This problem is therefore of general interest, including in the context of high-power applications: transportation (bicycles, cars, lorries, trains, etc.), autonomous systems (solar radio relays, roller shutters, connected objects, etc.), stationary storage, etc.

Generally speaking, a microbattery is an electrochemical device consisting of two electrodes (positive and negative) separated by an electrical insulator and ionic conductor (the electrolyte), and in which the ions (for example lithium ions) transit from one electrode to the other depending on whether the microbattery is charged or discharged.

The targeted field of application (Internet of Things, medical implants, autonomous sensors, etc.) imposes a significant constraint on the size of the energy sources supplying the devices. The positive electrode forms the lithium ion reservoir, and the amount of energy stored is linked directly to the volume thereof (at constant density).

One direct method for increasing the capacity of a microbattery may consist for example in increasing the thickness of the cathode, typically beyond 10 μm. It is also possible to form a stack of multiple battery units connected in parallel, thereby making it possible to keep an identical surface footprint.

However, these solutions have multiple drawbacks:
because of the cathode sputtering deposition technique, which is limited for thicknesses exceeding 10 μm, increasing the thickness of the positive electrode leads to an increase in surface and volume defectiveness, possibly leading to failure of the microbattery;
microbatteries exhibit irreversible loss of capacity between first charging and first discharging, which is all the more marked when the thickness of cathode is significant, which is therefore particularly detrimental for positive electrodes having a thickness greater than 10 μm.

FIG. 1 more precisely illustrates the charge current I and the potential difference E (V vs $Li^+/Li$) of a microbattery as a function of the charge capacity and of the discharge capacity for a lithium-based microbattery (positive electrode made of $LiCoO_2$, negative electrode made of titanium, solid electrolyte made of LiPON).

FIG. 1 shows the current profile (dashed curve with current scale on the right and Ah of charge scale at the top) during charging at a constant potential of 4.2 V. During discharging, a fixed current of −6 μA is applied, and the potential difference (curve in unbroken lines with voltage scale on the left and Ah of discharge scale at the bottom) varies between 4.2 V and 3 V.

The loss, representing 30% to 40% of the total capacity (difference between the charge and discharge capacity, highlighted by the horizontal arrow) is due to kinetic limitation at end of discharge. It is however possible to overcome this limitation, but with a significant decrease in the discharge current, thereby making it impossible to supply any component outside of a standby mode.

FIG. 2 illustrates this case, more precisely the evolution of the discharge current (expressed in μA) as a function of the discharge capacity expressed in μAh. FIG. 2 also highlights the potential difference E (V vs $Li^+/Li$).

In the first regime, the microbattery may generally operate with an imposed current of −6 μAh, generating a voltage decrease across the terminals of said microbattery. In the second regime, it is typically possible to maintain a voltage of 3 V, and a discharge current decrease that is left free, changing from −6 μAh to a far lower current close to 0.

In the second regime, it is also possible to impose a very low current, as shown in FIG. 3.

It is thus demonstrated that, in both scenarios, the discharge current becomes very low, no longer making it possible to achieve a sufficient supply current in the second regime.

It therefore becomes necessary to use an energy management circuit associated with the microbatteries in order to overcome the abovementioned drawbacks.

A device that proposes to manage energy for stacked microbatteries is known in the field of microbatteries, and is described notably in patent US009635147B2, Univ. of Michigan. The microbatteries supply a capacitive charge reservoir the function of which is to supply the external circuit, by supplying the current peaks required by the application.

This charge reservoir is regularly recharged during operation of the device by way of the microbatteries. This constitutes the main drawback of this solution, since periodic recharging leads to an inherent limitation on the information transmission rate. Moreover, the larger the reservoir, the more expensive it is in terms of surface area and manufacture.

Document US009252415B2, Medtronics, also discloses placing microbatteries in parallel by stacking wafers, the chips being connected by way of redistribution and via layers, during the stacking process.

However, the two solutions described above do not address the question of irreversible loss after the first cycle, to the detriment of the capacity and the volume footprint of the components in line with the desired objective, in particular in the case of significant cathode thicknesses (thickness greater than 10 μm).

The Applicant has focused on this irreversible loss and has notably demonstrated that, in a second discharging regime of the microbattery, which may represent up to 34% of the stored energy, the current is too low to guarantee nominal operation of the application.

In order to solve this problem, the Applicant is proposing an assembly of electrical energy storage or production cells comprising an energy management circuit, making it possible to optimize the period of autonomy of the assembly and notably to keep a cell available in its first regime, whereas the other cell or cells continue to supply current in their second regime (second discharge portion). This solution may be particularly suitable in the case of microbatteries, but also relevant in any other case of electrical energy storage or production cells, and makes it possible to continue to supply an application current for a prolonged period.

Discharging of a cell is prioritized so as to use its second regime as early as possible, and the following cells are switched successively so as to supply the additional current necessary to satisfy the needs of the application at all times. This may result in a gain in capacity of the order of 30-35% during operation, in comparison with the standard case in which the batteries are discharged only over the first 66%.

SUMMARY OF THE INVENTION

It should be noted that, in the context of the present invention, a battery or electrical energy storage or production cell is defined as being an elementary cell or an assembly of elementary cells placed in series and/or in parallel.

The assembly of the invention comprises a set of cells and an associated management circuit, wherein:

the set consists of two or more cells, the energy is supplied in a stepped manner by each of the cells so as to use all of their capacity, by smoothing the effect of kinetic limitation in the second regime;

the cells are able to be addressed simultaneously with different regimes depending on their state of charge;

the cells and the management circuit may advantageously be contained in a 3D stack;

in the case of cells such as the conventional microbatteries described in the preamble, the thickness of the positive electrode may typically, but without limitation, be greater than 10 μm, since losses are more significant the higher the total capacity.

The invention relates more precisely to an assembly able to deliver an output current Is, comprising:

N electrical energy storage or production cells of rank i, where N≥2, each cell comprising an elementary cell or an elementary assembly of elementary cells placed in series and/or in parallel, each electrical energy storage or production cell being able to supply a maximum current $I_{max,i}$ at all times t;

a management circuit for managing said electrical energy storage or production cells characterized in that, with said electrical energy storage or production cells being classed according to their rank i in decreasing priority of use, said management circuit comprises means, in discharge mode, for addressing at least the electrical energy storage or production cell of rank 1 or the electrical energy storage or production cells according to their rank i and according to the following criteria:

the electrical energy storage or production cell of rank 1 is addressed on its own as long as it is able to supply the output current $I_s$, where $I_s < I_{max,1}$;

the electrical energy storage or production cell of rank 1 is addressed with additionally a number k of electrical energy storage or production cells that are addressed successively according to their rank i, so as to supply the current $I_s$ at all times in discharge mode, the number k being such that 2<k≤N and meeting the following conditions:

$$\Sigma_{i=1}^{k-1} I_{max,i} < I_s \text{ and } \Sigma_{i=1}^{k} I_{max,i} \geq I_s$$

According to some variants of the invention, the management circuit for managing said electrical energy storage or production cells comprises:

blocks of rank i, each electrical energy storage or production cell being coupled to a block, each cell coupled to a block being capable of delivering an output current;

the set of said blocks generating an output current $I_s$ equal to the sum of the output currents $I_i$, said blocks selecting: the first electrical energy storage or production cell until it is totally depleted, without exceeding the current value $I_{max,1}$, and then the second electrical energy storage or production cell until it is totally depleted, without exceeding the current value $I_{max,2}$, etc., and then the $N^{th}$ electrical energy storage or production cell.

According to some variants of the invention, each block comprises a switch, the management circuit for managing said electrical energy storage or production cells controlling each of said electrical energy storage or production cells through hysteresis in all-or-nothing mode.

According to some variants of the invention, each block comprises a regulator with a reference output voltage $Uth_i$. It may operate with an output voltage $V_s$, each block comprising a regulator that operates with a voltage threshold, and the voltage thresholds of the regulators being such that:

$$Uth_2 > Uth_3 > \ldots > Uth_N \text{ and}$$

the cell of rank 1 is activated on its own if $V_s \geq Uth_2$ so as to supply $I_{max,1}$;

the second cell is activated in addition to the first cell so as to supply an additional current, when $V_s < Uth_2$; etc.;

the $N^{th}$ cell is activated in addition to the cells of lower rank so as to supply an additional current when $V_s < Uth_N$.

According to some variants of the invention, the assembly operates with an output voltage $V_s$ and is characterized in that each block comprises a switched-mode converter having a setpoint voltage and able to supply:

a current at output when the output voltage $V_s$ is lower than said setpoint voltage, in order to keep the output voltage $V_s$ at the setpoint voltage, and a zero current when the output voltage $V_S$ is greater than this setpoint.

According to some variants of the invention, the assembly comprises electrical energy storage or production cells having different electrical capacity values.

According to some variants of the invention, the electrical energy storage or production cells have electrical capacity values that decrease according to the rank i.

According to some variants of the invention, the management circuit comprises means, in recharge mode, corresponding to a negative output current $-I_s$, for placing all of the cells in parallel.

According to some variants of the invention, the management circuit comprises means, in recharge mode, corresponding to a negative output current $-I_s$, for addressing the cells of high rank as a priority, from rank N to rank 1.

According to some variants of the invention, the elementary electrical energy storage or production cells are batteries.

According to some variants of the invention, the elementary electrical energy storage or production cells are microbatteries.

According to some variants of the invention, the elementary electrical energy storage or production cells are hydrogen fuel cells.

According to some variants of the invention, the microbatteries and the management circuit are contained in a 3D stack.

BRIEF DESCRIPTION OF THE DRAWINGS

The invention will be better understood and other advantages will become apparent on reading the following description, which is given without limitation, and by virtue of the figures, in which.

DETAILED DESCRIPTION

Figure 1:
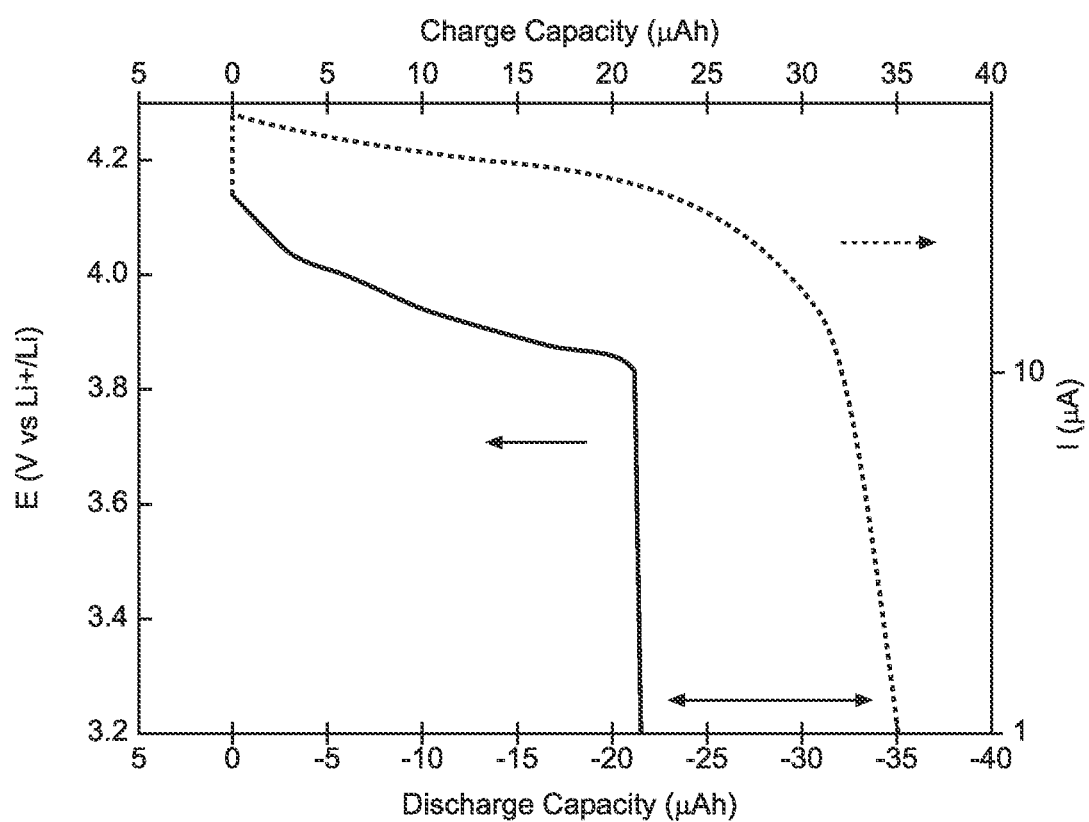
FIG. 1 illustrates the loss of capacity between the first charge and the first discharge in a microbattery according to the known prior art.
Figure 2:
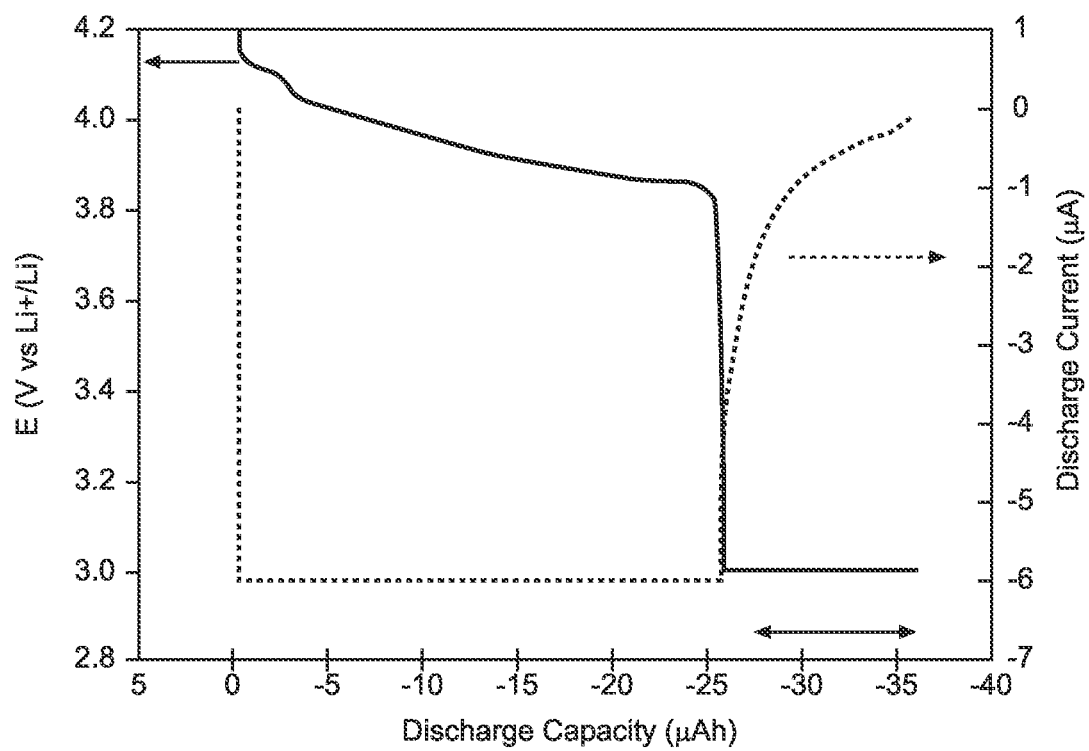
FIG. 2 illustrates the voltage and current behaviour during a discharging operation as a function of time, and notably in the second regime of a microbattery kept at a voltage of 3 V.
Figure 3:
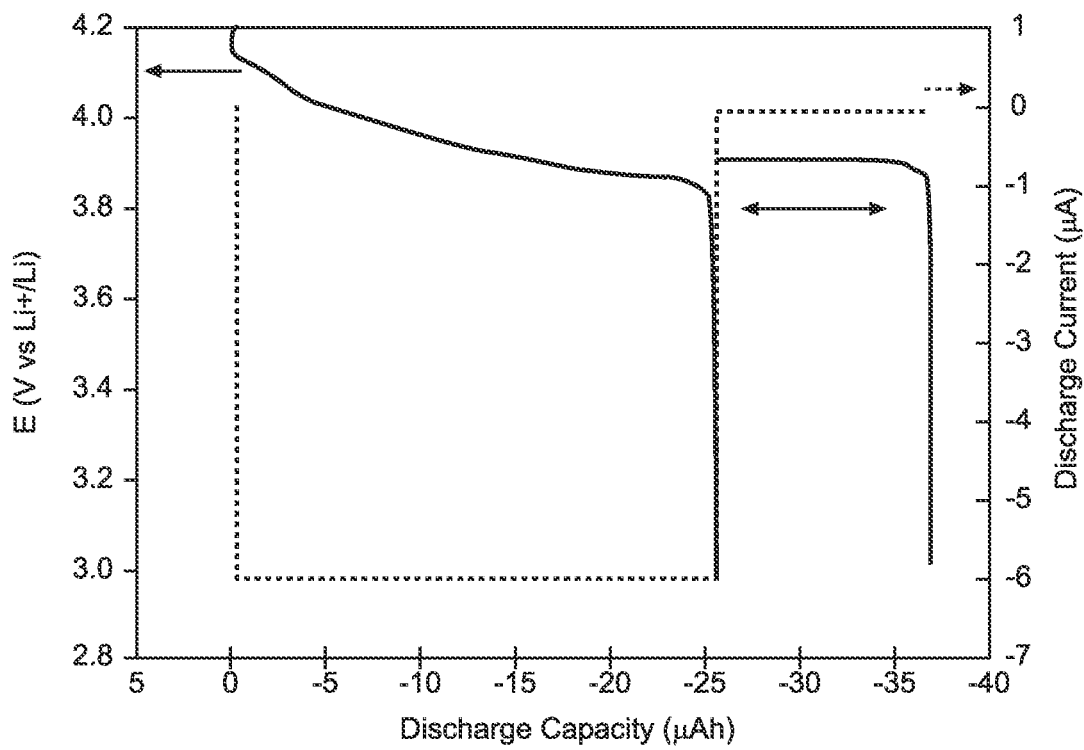
FIG. 3 illustrates the voltage and current behaviour during a discharging operation as a function of time, and notably in the second regime of a microbattery kept with a very low discharge current.
Figure 4:
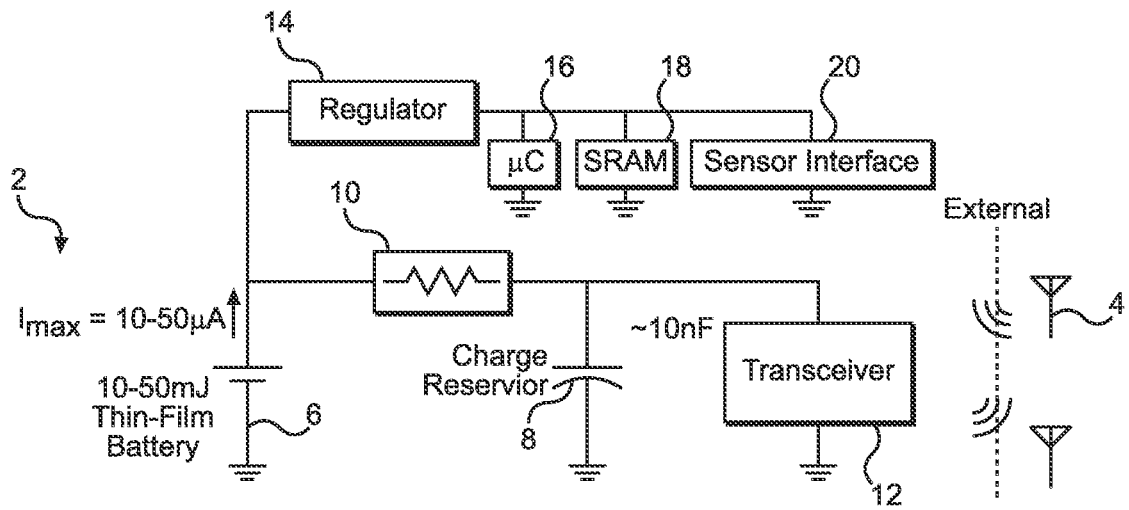
FIG. 4 illustrates a first example of an energy management circuit for microbatteries according to the prior art.
Figure 5:
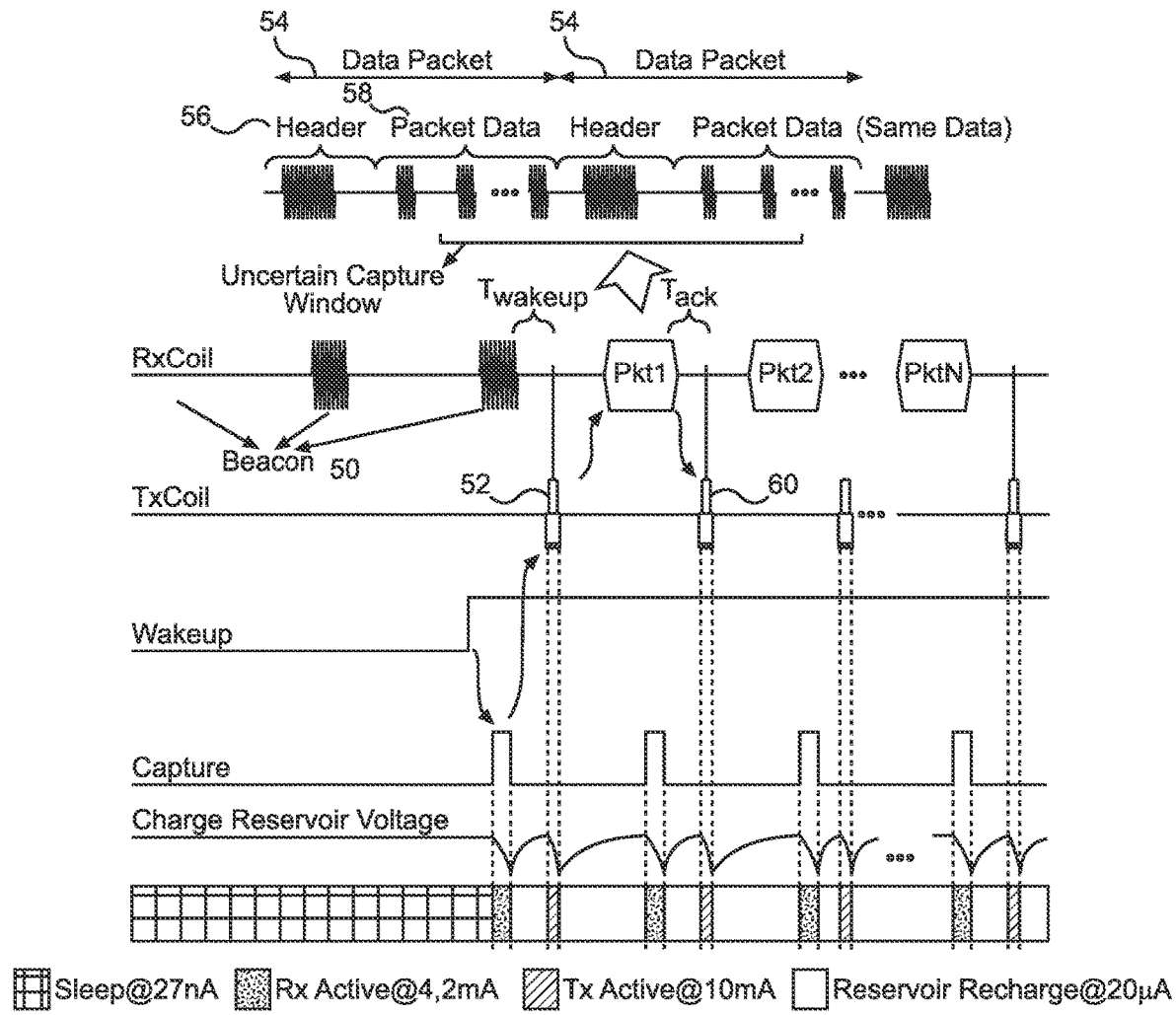
FIG. 5 illustrates a second example of an energy management circuit for microbatteries according to the prior art.
Figure 6:
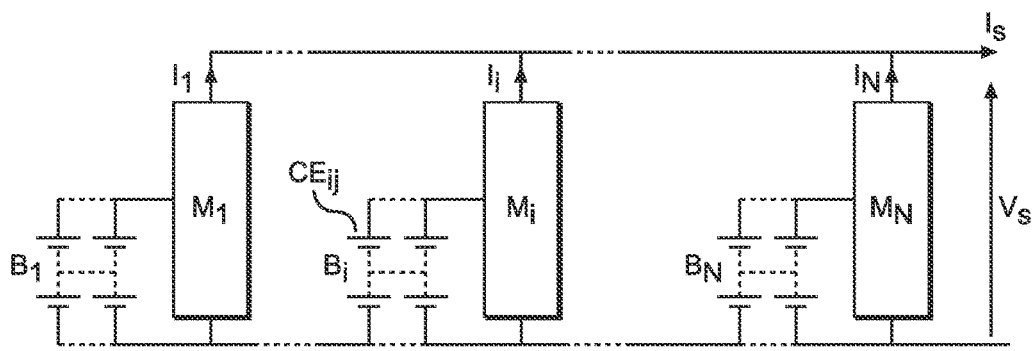
FIG. 6 schematically shows an assembly comprising an energy management circuit according to the invention.

Generally speaking, a cell is defined in the present patent application as being an elementary electrical energy storage or production cell or an elementary assembly of elementary electrical energy storage or production cells placed in series and/or in parallel, as described in following FIG. 6, showing the cells $B_i$ consisting of an assembly of elementary sub-cells $CE_{ij}$.

The elementary cell $CE_{ij}$ is typically an electrochemical pair, such as a battery, microbattery, hydrogen fuel cell, etc. This elementary cell may be combined with other elementary cells in series so as to achieve a certain voltage, such as 12 V in a lead-acid battery that combines 6 elements in series, and/or which may be combined in parallel so as to supply a higher current.

In the detailed description below, the elementary cell is a microbattery, the applied management circuit still being able to be the same in the more general scope of an elementary cell other than a microbattery.

As shown in FIG. 6, the management circuit comprises blocks $M_i$ coupled to the cells $B_i$.

The desired objective with all of the blocks $M_i$ is to give preference to one cell until it is totally depleted, and then to a second one until it is totally depleted, etc., without however exceeding a maximum current value $I_{max,i}$ for each of the cells that depends on the state of charge of said cell.

The current $I_s$ is imposed by the output load and may fluctuate over time in line with needs. This results from the sum of the currents $I_1, I_2, \ldots I_N$ at the output of each of the blocks $M_i$, in the knowledge that each cell is able to supply a maximum current $I_{max,i}$ at all times that cannot be exceeded.

The blocks $M_i$ may be of different kinds and control the current for example through a connection rate, through a step-down assembly or through a voltage regulator.

Figure 7A:
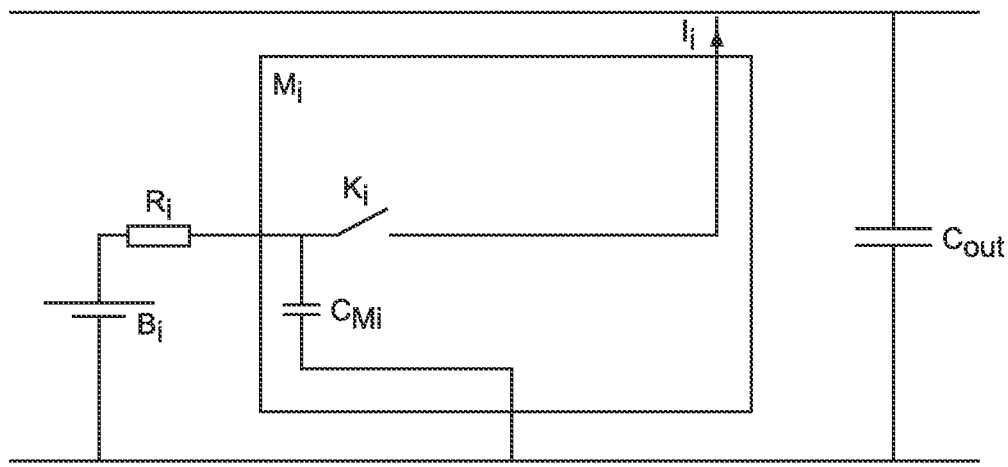
FIG. 7a illustrates one example of a block correlated with a cell able to be used in an assembly comprising an energy management circuit according to the invention.
Figure 7B:
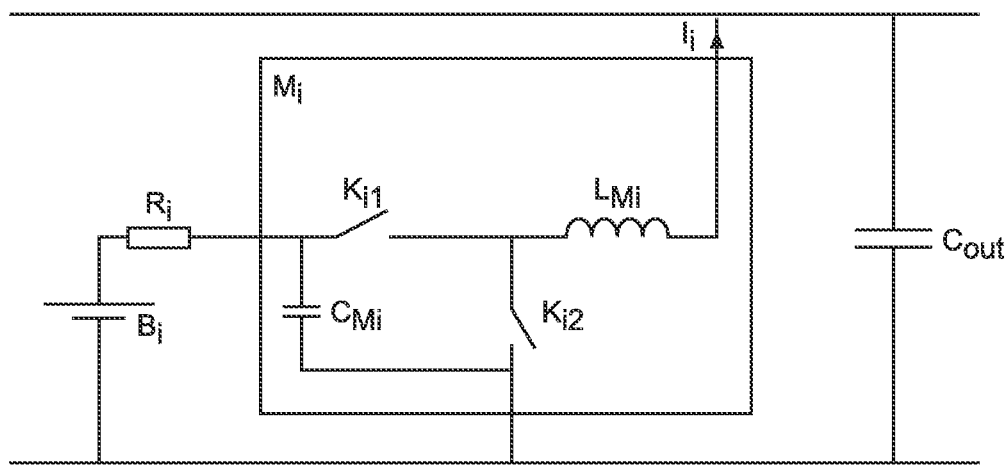
FIG. 7b illustrates one example of a block correlated with a cell able to be used in an assembly comprising an energy management circuit according to the invention.
Figure 7C:
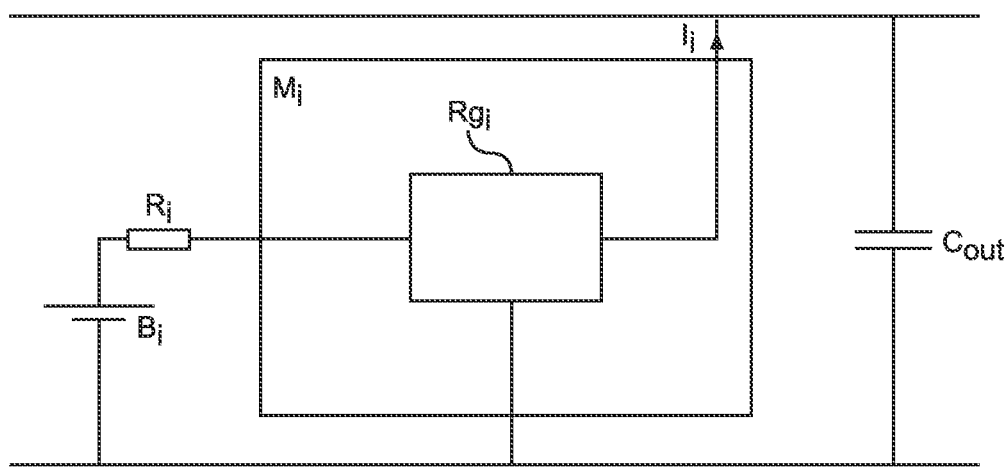
FIG. 7c illustrates one example of a block correlated with a cell able to be used in an assembly comprising an energy management circuit according to the invention.

FIGS. 7a, 7b and 7c illustrate 3 examples of a block $M_i$ coupled at input to a cell $B_i$ and an optional resistor $R_i$ and at output to a load $C_{out}$. More precisely, FIG. 7a shows one example of a device with series filtering and switching, comprising a switch $K_i$ and a capacitor $C_{Mi}$. FIG. 7b shows one example of a switched-mode converter device comprising two switches $K_{i1}$ and $K_{i2}$, a capacitor $C_{Mi}$ and an inductor $L_{Mi}$. FIG. 7c shows one example of a device with a voltage regulator $Rg_i$. These three exemplary blocks $M_i$ make it possible to regulate the currents so as to selectively address or not address the cells coupled to said blocks.

Figure 8:
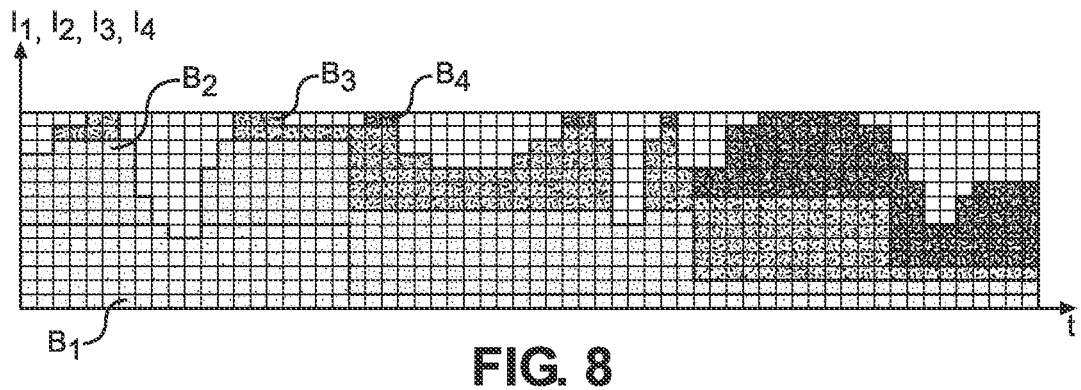
FIG. 8 illustrates one example of the evolution of an output current as a function of time correlated with the use of one, two, three or four cells in one example of an assembly comprising an energy management circuit operating with a set of 4 cells, according to the invention.

In one example, the evolution of the output current $I_s$ of which is illustrated over time in FIG. 8 and that operates with 4 cells, it appears that preference is given for example to cell $B_1$, and then cell $B_2$, and then cell $B_3$ and finally cell $B_4$, so as to satisfy the current requested by the output at all times t.

Specifically, according to the present invention, the cells are classed according to their increasing rank i in decreasing priority of use.

The cell $B_1$ is addressed as a priority and, if it is able to supply a sufficient current $I_{max,1} \geq I_s$, it is the only one that is addressed (e.g., discharged).

If $I_{max,1} < I_s$, it is necessary to determine the number of cells k to be addressed while complying with the order of priority, making it possible to satisfy the required output current.

The electrical energy storage or production cell $B_1$ of rank 1 is addressed with additionally a number k of electrical energy storage or production cells $B_i$ that are addressed successively according to their rank i, so as to supply the current Is at all times in discharge mode, the number k being such that $2 < k \leq N$, N being the number of cells present in the assembly and meeting the following conditions:

$$\Sigma_{i=1}^{k-1} I_{max,i} < I_s \text{ and } \Sigma_{i=1}^{k} I_{max,i} \geq I_s$$

The Applicant performed simulations with assemblies comprising a variable number of lithium-ion microbatteries with and without the management circuit according to the invention in order to successively address multiple microbatteries.

The simulation assumptions are as follows:
needs of the application equal to 4 μA continuously,
considering a total capacity of 108 μAh distributed over N microbatteries (take for example 3 cells of 36 μAh in parallel), the first 72.2% of the capacity (78 μAh) is accessible with a current in the first regime of C/6, that is to say 18 μA (current equal to the capacity divided by 6 hours: 108 μAh/6 h).

The last 27.8% of the capacity (30 μAh) is accessible with a current in the second regime equal to the capacity divided by 36 (with a current of C/36), that is to say a current of 3 μA.

Use of a Single Cell

If using only a single microbattery of 108 μAh (possibly consisting of multiple microbatteries in parallel), only the current in the first regime (18 μA) is able to satisfy the application (4 μA), the current in the second regime, equal to 3 μA, being less than the application current of 4 μA. Only 72.2% of the capacity of the microbattery is usable, that is to say 78 μAh, or else that is to say an autonomy of 78 μAh/4 μA=19.5 h.

Use of Two Cells within the Scope of the Invention:
Use of Two Identical Cells within the Scope of the Invention:

Let us take two identical cells each of 54 μAh (overall capacity of 108 μAh), each one having a current in the first regime $I_{max}$ of 54 μAh/6=9 μA and a current in the second regime $I_{max}$ of 54 μAh/36=1.5 μA.

Figure 9:
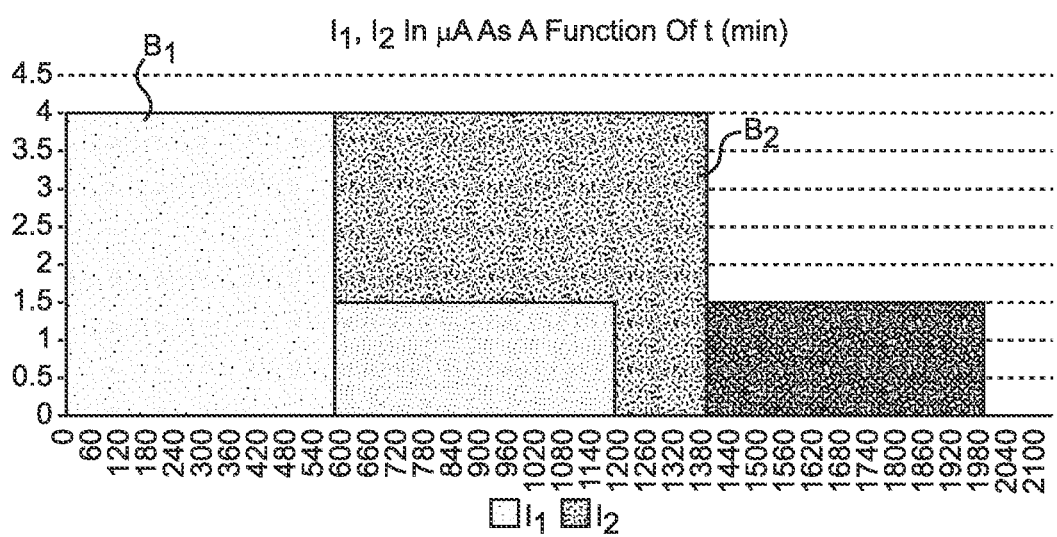
FIG. 9 illustrates the output current behaviour as a function of time with one example of an assembly comprising an energy management circuit according to the invention comprising two identical cells.

The current profile as a function of time is illustrated in FIG. 9 and demonstrates the current profile, where $I_1$ is the current drawn from the first cell (4 μA) and $I_2$ is the current drawn from the second cell (the second regime is shown in hatched form in comparison with the first regime).

The 72.2% of a capacity of 54 μAh is able to supply a current of 4 μA for 584.8 minutes.

When changing to the second regime of the first cell, it is then possible to supply only a current less than or equal to the current $I_{max,1}$ of the second regime, established at 1.5 μA.

The second cell is then addressed, this being responsible for supplying the additional current of 2.5 μA (additional from 4 μA-1.5 μA), this current remaining well below the $I_{max,2}$ of the second cell in its first regime (9 μA).

By splitting the capacity of the microbattery in two (in FIG. 9: non-hatched region and hatched region) and by giving preference to discharging one of the two, the device is able to supply the requested 4 μA for 23.25 hours, that is to say an autonomy increased by 3.75 hours or +19% in comparison with a single microbattery having an equivalent nominal capacity.

Beyond the 1395th minute (23.25 h), the device is able to supply only 1.5 μA, this no longer being sufficient to supply the application, and this remaining energy is therefore not used.

Use of Two Different Cells Optimized According to the Invention:

The same reasoning is followed considering two different cells in order to gain even more autonomy and optimizing the relative capacity of the two cells. The Applicant performed simulations with cells having different capacities, and demonstrated an optimum with one cell of 86 μAh and the other of 22 μAh.

Figure 10:
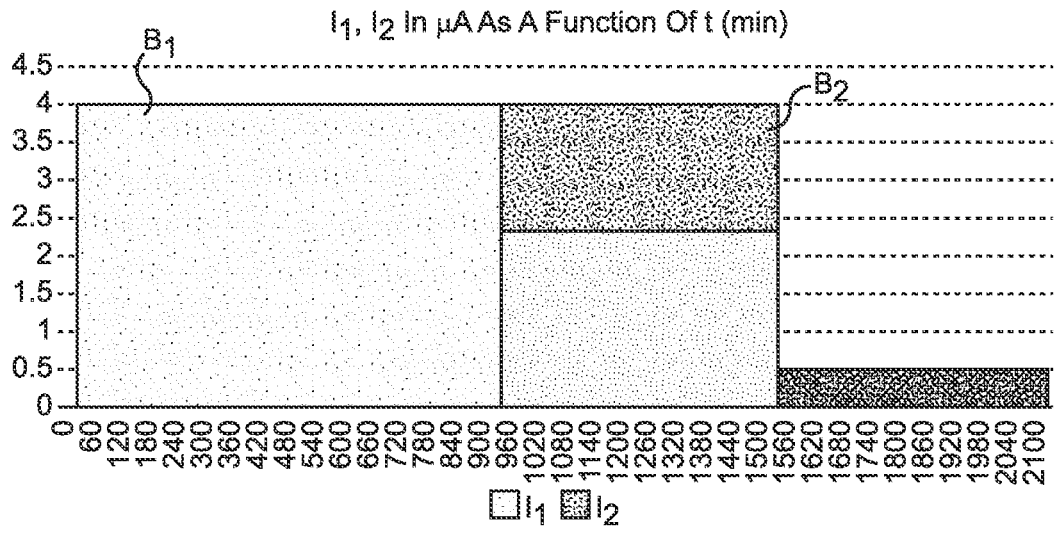
FIG. 10 illustrates the output current behaviour as a function of time with one example of an assembly comprising an energy management circuit according to the invention comprising two different cells.

The current profile achieved with this optimization of two different cells as a function of time is illustrated in FIG. 10 and demonstrates the current profile, where $I_1$ is the current drawn from the first cell and $I_2$ is the current drawn from the second cell.

The autonomy for supplying 4 μA then changes to 25.5 h, that is to say 2.25 h more than previously and 6 h more than in the case of a single cell.

Use of Three Cells within the Scope of the Invention
Use of Three Identical Cells within the Scope of the Invention:

If using 3 identical cells of 36 μAh (still 108 μAh in total), the autonomy is 24.375 hours, this being better than with just one cell or two identical cells, but not as good as with two cells that are well optimized with respect to one another.

Use of Three Different Cells Optimized within the Scope of the Invention:

The Applicant demonstrated an optimum autonomy with 3 cells respectively of 89 μAh, 11 μAh et 8 μAh, making it possible to achieve an autonomy of 26.12 h, that is to say 0.625 h more than with two optimum cells.

Figure 11:
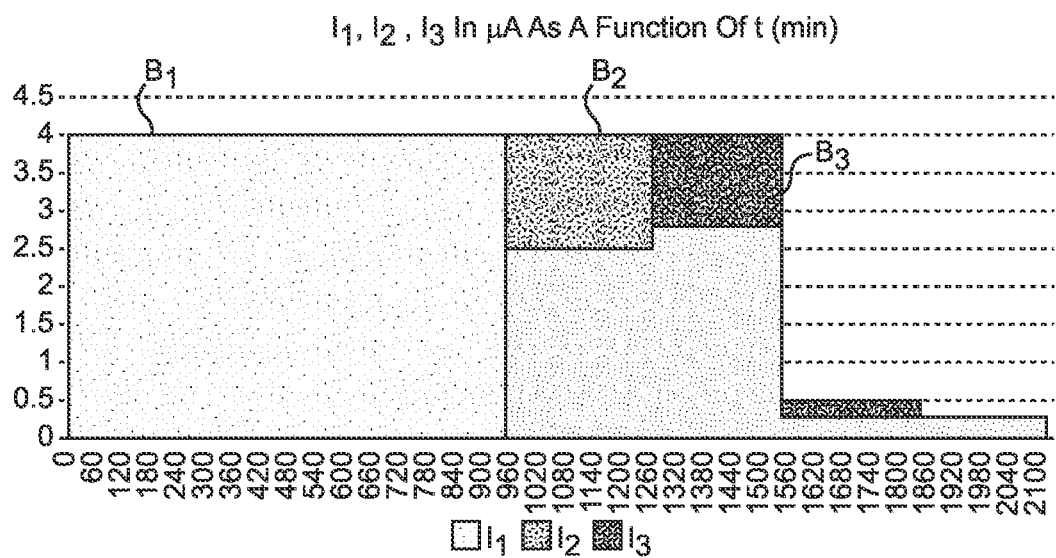
FIG. 11 illustrates the output current behaviour as a function of time with one example of an assembly comprising an energy management circuit according to the invention comprising three different cells.

The current profile achieved with this optimum as a function of time is illustrated in FIG. 11 and demonstrates the current profile, where $I_1$ is the current drawn from the first cell, $I_2$ is the current drawn from the second cell and $I_3$ is the current drawn from the third cell.

In conclusion, these simulations demonstrate that the solution presented in the present invention makes it possible to achieve a gain that may possibly reach around 33% in terms of autonomy (comparison of three cells addressed in parallel, and three optimized cells addressed according to the management circuit proposed in the present invention).

Figure 12:
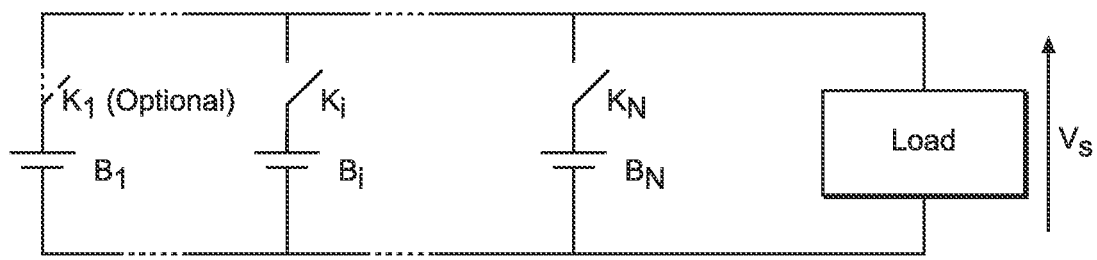
FIG. 12 illustrates one example of an assembly comprising an energy management circuit according to the invention comprising blocks based on switches.

First Example of an Algorithm for Controlling the Cells in an Energy Storage Device Comprising a Control Circuit According to the Invention:

The assembly of the invention may be the one shown schematically in FIG. 12 and comprise cells $B_i$ coupled to switches $K_i$.

According to this first example, the cells are controlled through hysteresis in all-or-nothing mode, as explained below:

Let us take cells $B_1, B_2, B_3, \ldots, B_N$ classed in decreasing priority of use during operation in discharge mode ($B_1$ is the one that is connected first of all and $B_N$ is the one that is connected last of all).

Let $U_{high}$ be a upper voltage threshold and $U_{low}$ be a lower voltage threshold, framing the output voltage $V_s$, these voltage thresholds relating to normal operation of the cell. These are hysteresis thresholds that may be different from the minimum and maximum voltage thresholds that the cell is able to withstand. Typically, $U_{low}$ may be close to the minimum voltage of the cell as specified by the manufacturer (for example+5% to +20% of this limit value), whereas $U_{high}$ may be located substantially midway between the minimum and maximum voltages specified by the manufacturer.

Operation in discharge mode is as follows:

The cell $B_i$ is in practice always connected in discharge mode. The state "0" indicated in FIG. 13 is present.

The discharge voltage should not drop below the lower voltage threshold $U_{low}$, which may typically be 3 V for a Li$^+$/Li battery.

First of all, when the cell $B_i$ is in discharge mode, as long as $V_s \geq U_{low}$, only $B_1$ is activated and $B_1$ is able to supply a current $I_{max,1}$.

Figure 13:
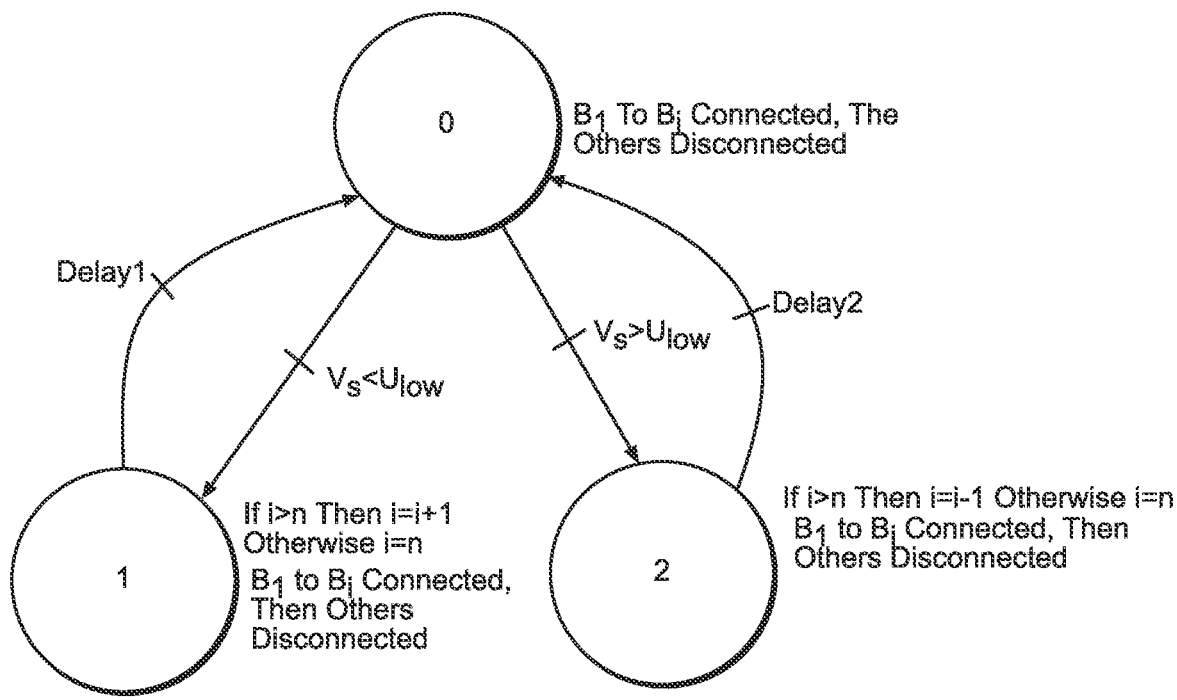
FIG. 13 illustrates one example of an algorithm for controlling the cells, performed through hysteresis in all-or-nothing mode, able to be used in the management circuit of an assembly such as the one illustrated in FIG. 12, during a discharging operation.

When $V_s < U_{low}$, the system changes to the state "1" in FIG. 13, the cell $B_2$ is activated in addition to the cell $B_1$. Each time the system passes through the state "1" in FIG. 13, the index i is incremented by 1 (i=i+1), unless i has already reached N, this schematically showing the connection of the cell of higher rank $B_{i+1}$, in order to supply the requested current.

After a chosen stabilization time called Delay1, there is a return to the state "0", with a set of cells connected in discharge mode.

The principle thus consists in connecting the following cell $B_{i+1}$ when the output voltage Vs drops below a lower voltage threshold $U_{low}$.

There is also an upper cell hysteresis voltage $U_{High}$.

Plus, if the voltage $V_s$ is such that $V_s > U_{High}$, it is decided to preferably disconnect the connected cell having the highest index. This disconnection action is illustrated by the state "2" in FIG. 13 and shown schematically by the change of i=i−1.

Following the incrementing or decrementing of the number of connected cells (within the limit of the stops 1 to N), a small waiting period Delay1 or Delay2 may be applied before returning to the state "0", such that the output voltage has time to stabilize to its new value following the change in configuration and to avoid having excessively high-frequency switching (for example >100 kHz) linked to an unstable situation between two values of i.

In recharge mode, it is said that all of the cells are placed in parallel and all of the cells are recharged at the same time, typically when the charging system is not actually limited in terms of current with respect to the current with which the cells are able to be recharged.

If on the other hand the current available for recharging is relatively moderate (is not able to charge all of the cells quickly), then a reverse priority may be applied by giving preference to recharging the cell N, and then recharging the cell N−1, etc., so as to rapidly again give the system the possibility of supplying a high current.

Second Example of an Energy Storage Device Comprising a Control Circuit According to the Invention:

According to this second example, the battery cells are controlled in linear mode.

With reference to FIG. 6, each cell $B_i$ is associated with a block or management circuit $M_i$. This management circuit may for example be of the type in FIG. 7b or the type in FIG. 7c.

This type of management circuit makes it possible to more accurately manage the current contribution of each cell to the output current.

It makes it possible for example to be able to choose a higher current on the cell $B_1$ than on the cell $B_2$ when the two of them contribute.

The Linear Mode May be Defined by Threshold Voltages:

Operation in discharge mode is as follows:

Let us take $Uth_2, \ldots, Uth_i, \ldots, Uth_N$ as voltage thresholds with decreasing values, corresponding to input voltage thresholds respectively of the blocks $M_2, \ldots, M_i, \ldots, M_N$.

When the output voltage $V_s$ is greater than or equal to $Uth_2$, then only the first cell $B_1$ supplies the output voltage.

When the output voltage $V_s$ tends to drop below $Uth_2$, then the second cell intervenes just to the extent necessary to keep $V_s = Uth_2$, while the first cell is 100% connected (as if a switch were to directly connect the first cell to the output with a very low voltage drop).

When the two first cells no longer manage to maintain the voltage $Uth_2$, then the voltage $V_s$ drops below $Uth_2$ in spite of the 2 first cells that are 100% connected.

When the output voltage tends to drop below $Uth_3$, then the third cell intervenes just to the extent necessary to keep $V_s$ at $Uth_3$, while the two first cells are 100% connected.

And so on, until the last cell intervenes to keep $V_s$ at a voltage $Uth_N$.

Figure 14:
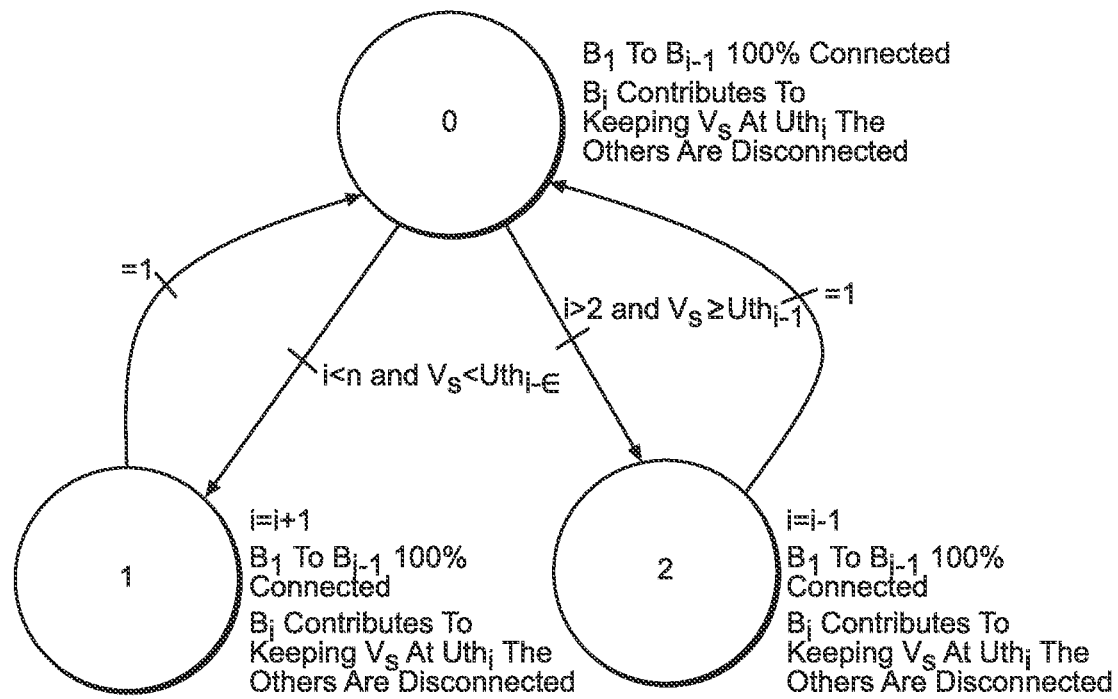
FIG. 14 illustrates one example of an algorithm for controlling the cells, able to be used in a management circuit of an assembly according to the invention and operating in linear mode, defined by threshold voltages (operation at discharge)

The operating principle is also illustrated in FIG. 14 in graphical form.

In the state "0", the cells $B_1$ to $B_{i-1}$ are 100% connected, the cell $B_i$ contributes to keeping the output voltage $V_s$ at the voltage $Uth_i$, and the other cells $B_{i+1}$ to $B_N$ are disconnected.

When $V_s$ continues to drop and becomes such that $V_s < Uth_i - \varepsilon$, the cell $B_i$ is addressed so as to contribute to keeping $V_s$ equal to $Uth_i$, and at this time there is a change to the state "1".

Specifically, a small $\varepsilon$ may be added to or subtracted from the threshold voltages for the comparisons of the voltage $V_s$ depending on whether the voltage $V_s$ increases or decreases, so as to form a small hysteresis and avoid unwanted switching operations around the threshold voltage.

In the same way as above, when the voltage $V_s > Uth_{i-1}$, the cell of highest rank is disconnected, and only $B_1, \ldots, B_{i-1}$ are connected.

In practice, it is easy to implement such a principle using regulators as described in FIG. 7c, with a reference output voltage $Uth_i$ for each regulator, with voltages $Uth_i$ that decrease with the index i.

Likewise, it is also possible to use the output voltage setpoint on converters as described in FIG. 7b or else on series switched-mode systems (described in FIG. 7a) or any other type of converter.

It should be noted that these converters supply a current at output only when the output voltage tends to drop below their setpoint voltage in order to keep the output voltage at the desired setpoint voltage, and that, when the output voltage is greater than this setpoint, the output current is zero (that is to say that the cell is as if it were disconnected completely from the output).

In recharge mode, it is possible to place all of the cells in parallel or to apply any other configuration via another dedicated assembly.

The Linear Mode May be Defined by Available Currents:

The management circuit may also comprise or be connected to an estimator for estimating the maximum current $I_{max,i}$ that the cell $B_i$ is able to supply at all times.

This estimator may for example be based on a prior recording of the maximum current not to be exceeded on the cell $B_i$ as a function of its state of charge, of its temperature, etc. In this case, the system estimates the state of charge of the cell, for example as a function of its voltage, of its temperature, of the number of ampere-hours that have elapsed, etc., and then determines the maximum current that is able to be drawn from the cell $B_i$.

The value of this maximum current $I_{max,i}$ may furthermore have been determined so as to guarantee a certain service life, and it is then not an absolute maximum current, but a maximum current recommended to guarantee the durability of the battery and/or a certain efficiency and/or contain heating and/or the like.

In practice, there are numerous possible methods for determining at all times this maximum current $I_{max,i}$ not to be exceeded. This is a maximum at all times, which could be defined as an $I_{max,i}(t)$.

Figure 15:
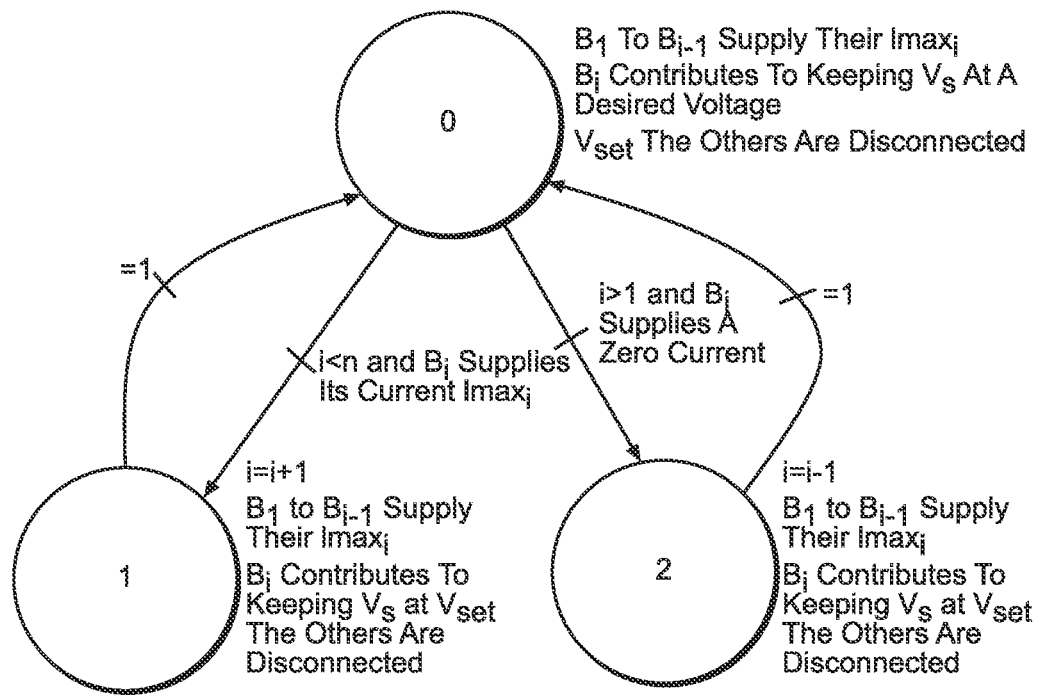
FIG. 15 illustrates one example of an algorithm for controlling the cells, able to be used in a management circuit of an assembly according to the invention and operating in linear mode, defined by a balance between current available on each cell and requested current (operation at discharge)

The diagram in FIG. 15 illustrates the steps of the algorithm for managing discharging with such operation in linear mode defined by available currents.

In the state "0", the electrical energy storage or production cells $B_1$ to $B_{i-1}$ supply their maximum current $I_{max,i}$, the cell $B_i$ contributes to keeping the voltage $V_s$ at a desired voltage $V_{set}$, and the other cells are disconnected.

It should be noted, in the diagram, when i=1, that only the cell $B_1$ supplies the current required to keep $V_s$ at $V_{set}$.

If the connected cell having the highest index supplies a zero current, it may be disconnected (i=i−1). By contrast, if the cells that are contributing are not able to maintain the output voltage, then the following cell (i=i+1) has to contribute.

The general objective is to guarantee a voltage level at output, hence the objective whereby "$B_i$ contributes to keeping $V_s$ at a desired voltage $V_{set}$", but other objectives may be contemplated:

"$B_i$ contributes to keeping the output current Is at a desired current value $I_{set}$ (current source system)";

"$B_i$ contributes to keeping $V_s$ at a desired voltage $V_{set}$ within the limit of a current $I_{set}$ (current-limited voltage source system)".

Monitoring of the current $I_{max,i}$ or of the output objective may be implemented using switched-mode converters, as described in FIG. 7b, but other structures, for example step-up structures, may also be contemplated.

Any approach may be taken for recharging ($I_s<0$), for example placing all of the cells in parallel. One of the possibilities is that of performing recharging by giving priority to high-index cells, so as to rapidly recover current capacity in discharge mode (if the current $I_s$ ever reverses before the end of recharging).

Figure 16:
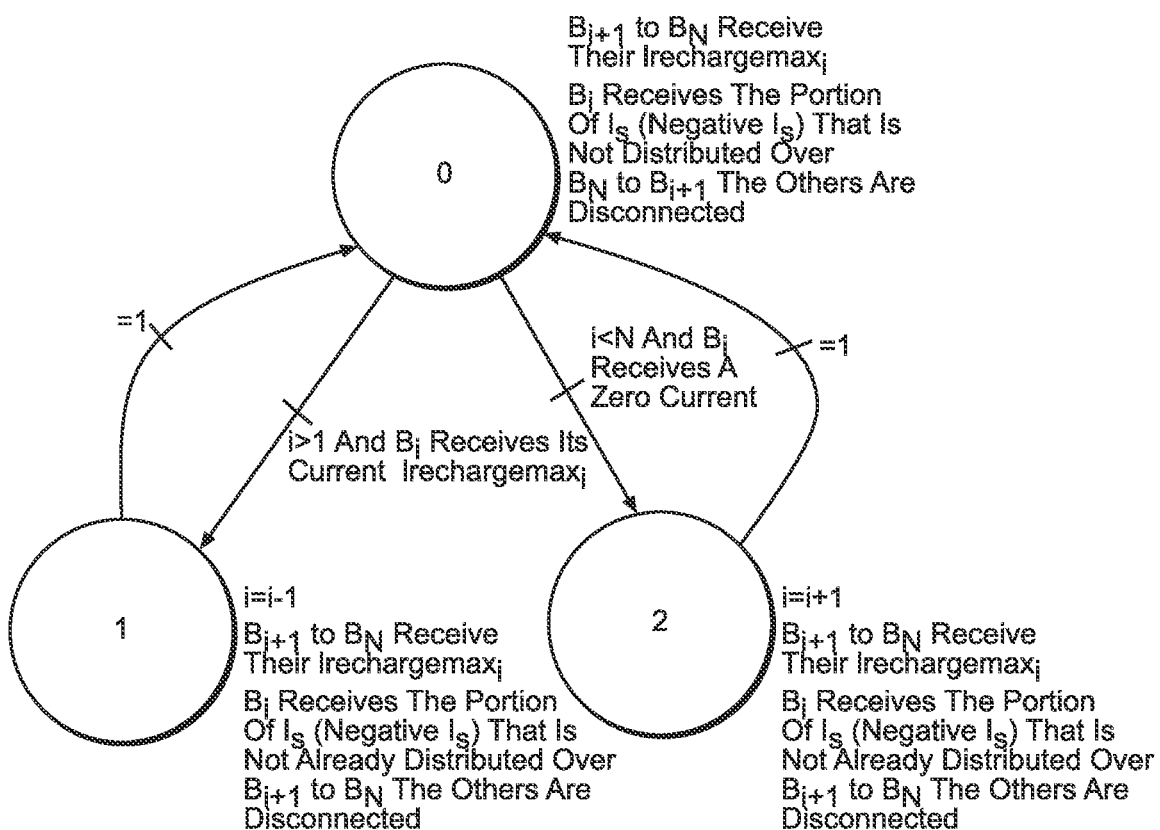
FIG. 16 illustrates one example of an algorithm for controlling the cells, able to be used in a management circuit of an assembly according to the invention and operating in linear mode, defined by a balance between acceptable recharge current on each cell and overall recharge current during a recharging operation.

FIG. 16 illustrates one example of an algorithm for controlling the cells, able to be used in a management circuit of an assembly according to the invention and operating with an order of reverse priority and while complying with the maximum recharge currents that each cell is able to accept during a recharging operation.

For this purpose, it is possible to define recommended maximum recharge currents at all times for each of the cells $B_i$: Irechargemax,i.

It should be noted, in FIG. 16, when i=N, that the expression "$B_{i+1}$ to $B_N$ receive their Irechargemax,i" is no longer relevant, and no cell receives its maximum current. Only the cell $B_N$ receives the recharge current $I_s$.

In the present case, the output current $I_s$ is negative, since it is a recharge current and not a discharge current.

The assembly of the present invention may advantageously be formed in a 3D stack, such as stacks of microbatteries described in the literature and notably in the reference "low-power analog techniques, sensors for mobile devices, and energy efficient amplifiers", Advances in Analog Circuit Design 2018, published by Springer, which discloses a stack of two microbatteries. With regard to the blocks Mi, it is possible to use voltage regulators such as the reference MIC5225YM5-TR from Microchip.

The invention claimed is:

1. An assembly for delivering an output current $I_s$, comprising:

N electrical energy storage or production cells $B_i$ of rank i, where N≥2, each cell comprising an elementary cell or an elementary assembly of elementary cells $CE_{ij}$ arranged in series and/or in parallel, each electrical energy storage or production cell being able to supply a maximum current $I_{max,i}$ continuously during a time period T;

a management circuit for managing said electrical energy storage or production cells Bi, wherein said electrical energy storage or production cells are ordered according to their rank i in decreasing priority order of use, wherein a production cell $B_i$ is able to provide a maximum current $I_{max,i}$ at any time t, said management circuit comprises means, in discharge mode, for discharging at least the electrical energy storage or production cell of rank 1 or the electrical energy storage or production cells according to their rank i and according to the following criteria:

the discharge of the electrical energy storage or production cell $B_1$ of rank 1 is activated:

if the electrical energy storage or production cell $B_1$ of rank 1 is able to supply an output current $I_s$, where $I_{max,1} \geq I_s$, only the electrical energy storage or production cell $B_1$ of rank 1 is discharged;

otherwise, if $I_{max,1}<I_s$, the electrical energy storage or production cell $B_1$ of rank 1 is discharged with additionally a number k of electrical energy storage or production cells $B_i$ that are discharged successively according to their rank i, so as to supply the current $I_s$ continuously during said time period T in discharge mode, the number k being such that 2<k≤N, the number k meeting the following conditions:

$\Sigma_{i=1}^{k-1} I_{max,i} < I_s$ and $\Sigma_{i=1}^{k} I_{max,i} \geq I_s$ said management circuit for managing said electrical energy storage or production cells $B_i$ comprising:

blocks $M_i$ of rank i for controlling the electrical energy storage or production cells Bi, each electrical energy storage or production cell Bi being coupled to a block $M_i$, each cell $B_i$ coupled to a block $M_i$ being capable of delivering an output current $I_i$, the set of said blocks $M_i$ generating said output current $I_s$ which is equal to the sum of the output currents $I_i$, the blocks $M_i$ being configured to selectively address the associated electrical energy storage or production cells $B_i$;

wherein each block $M_i$ comprises a regulator with a reference output voltage $Uth_i$, wherein the assembly operates with an output voltage $V_s$, the regulator of each block $M_i$ operating with a voltage threshold $Uth_i$, and the voltage thresholds of the regulators of the blocks $M_i$ being such that $Uth_2 > Uth_3 > \ldots > Uth_N$ and wherein in discharge mode:

the cell of rank 1, $B_1$, is first activated by the management circuit if $V_s \geq Uth_2$; and for each index i different from 1:

a next cell $B_{i+1}$ is activated in addition to the cells of lower rank $B_1 + B_2 + \ldots B_i$, when $V_s < Uth_{i+1}$, so as to supply an additional current, wherein when the voltage $V_s > Uth_{i-1}$, the cell of highest rank is disconnected, and only $B_1, \ldots, B_{i-1}$ are connected.

2. The assembly according to claim 1, comprising electrical energy storage or production cells having different electrical capacity values.

3. The assembly according to claim 1, wherein the electrical energy storage or production cells have electrical capacity values that decrease according to the rank i.

4. The assembly according to claim 1, wherein the elementary electrical energy storage or production cells are batteries.

5. The assembly according to claim 1, wherein the elementary electrical energy storage or production cells are microbatteries.

6. The assembly according to claim 1, wherein the elementary electrical energy storage or production cells are hydrogen fuel cells.

7. The assembly according to claim 1, wherein the microbatteries and the management circuit are contained in a 3D stack.

8. The assembly according to claim 1, further comprising an estimator configured to estimate said maximal current $I_{max,i}$ per instant time.

* * * * *